United States Patent
Herman et al.

(10) Patent No.: US 10,445,601 B2
(45) Date of Patent: Oct. 15, 2019

(54) AUTOMOTIVE VEHICLE NAVIGATION USING LOW POWER RADIOS

(71) Applicant: FORD GLOBAL TECHNOLOGIES, LLC, Dearborn, MI (US)

(72) Inventors: Dave A. Herman, Southfield, MI (US); Perry R. MacNeille, Lathrup Village, MI (US); Andrea Bowes Chowanic, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 283 days.

(21) Appl. No.: 15/050,988

(22) Filed: Feb. 23, 2016

(65) Prior Publication Data
US 2017/0243072 A1    Aug. 24, 2017

(51) Int. Cl.
| G06K 9/00 | (2006.01) |
| B60R 1/00 | (2006.01) |
| G01C 21/34 | (2006.01) |
| G01C 21/36 | (2006.01) |
| B62D 15/02 | (2006.01) |

(52) U.S. Cl.
CPC .......... *G06K 9/00812* (2013.01); *B60R 1/00* (2013.01); *G01C 21/3685* (2013.01); *G06K 9/00785* (2013.01); *B62D 15/028* (2013.01); *G01C 21/3407* (2013.01)

(58) Field of Classification Search
None
See application file for complete search history.

(56) References Cited

U.S. PATENT DOCUMENTS

| 7,893,847 | B2 | 2/2011 | Shanbhag et al. |
| 2003/0074129 | A1 | 4/2003 | Curbow et al. |
| 2010/0302068 | A1 | 12/2010 | Bandukwala |
| 2013/0113936 | A1* | 5/2013 | Cohen ............... G07B 15/02 348/148 |
| 2014/0176348 | A1 | 6/2014 | Acker, Jr. et al. |
| 2014/0313058 | A1 | 10/2014 | Chen et al. |
| 2014/0320318 | A1 | 10/2014 | Victor et al. |
| 2015/0009048 | A1 | 1/2015 | Wang et al. |

(Continued)

FOREIGN PATENT DOCUMENTS

| CN | 104918325 A | 9/2015 |
| JP | 2012171450 A | 9/2012 |

OTHER PUBLICATIONS

R. Faragher et al., An Analysis of the Accuracy of Bluetooth Low Energy for Indoor Positioning Applications, Proceedings of the 27th International Technical Meeting of The Satellite Division of the Institute of Navigation (ION GNSS+2014), Tampa, Florida, Sep. 2014, pp. 201-210.

(Continued)

*Primary Examiner* — Kate H Luo
(74) *Attorney, Agent, or Firm* — Frank A. MacKenzie; MacMillan, Sobanski & Todd, LLC (57) ABSTRACT

A navigation system for a parking area comprises a plurality of nodes and a server communicating with the nodes. Each node comprises a camera capturing images of the parking area and a low power radio transmitting a radio signal. The server analyzes the images to propose a parking space and provides an arrival sequence of waypoints to the parking space. Each of the waypoints comprises strength and time of flight values of the radio signals.

24 Claims, 5 Drawing Sheets

(56) References Cited

U.S. PATENT DOCUMENTS

2015/0066240 A1\* 3/2015 Das Adhikary ........ G01C 21/12
  701/1
2015/0124093 A1  5/2015 Wang et al.

OTHER PUBLICATIONS

Erik Dahlgren, et al., Evaluation of Indoor Positioning Based on Bluetooth® Smart Technology, Chalmers, Jun. 2014.

\* cited by examiner

AUTOMOTIVE VEHICLE NAVIGATION USING LOW POWER RADIOS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive vehicle infotainment systems and, more specifically, to an automotive vehicle infotainment system for vehicle navigation using low power radios.

Infotainment systems that assist a driver of a vehicle when navigating to a destination are well known and typically make use of a global navigation satellite system (GNSS) such as the global positioning system (GPS). Such infotainment systems make use of a navigation application or program that is integrated into the vehicle or provided in a portable, hand held unit. When the destination is a parking lot, the driver of the vehicle typically does not know if there is an available parking space in the parking lot. This is especially true if the parking lot is near full or otherwise crowded. Even when there is an available parking space in the parking lot, the driver may expend unnecessary fuel and time searching for the available parking space. It would also be desirable to more efficiently identify an available parking space, communicate the available parking space to the vehicle, and guide the vehicle to the available parking space.

SUMMARY OF THE INVENTION

This invention includes a navigation system for a parking area. The parking area comprises a plurality of parking spaces and a plurality of waypoints. The waypoints are deployed in a waypoint array over the parking area. Each of the waypoints comprises an identifier value for a location in the parking area. The navigation system employs a plurality of parking area nodes and a parking assist server.

The parking area nodes are deployed in a node array over the parking area. Each of the nodes comprises a camera and a low power radio. The low power radios each transmit a unique radio signal.

The parking assist server is in wireless communication with the nodes. The server analyzes images captured by the cameras, receives a parking request from a user, in response to the request, sends to the user a proposed parking space, and provides a vehicle arrival sequence of the waypoints. The images are of the parking area and are analyzed to detect an availability status of the parking spaces. The availability status is occupied or unoccupied. The proposed parking space is proposed, in response to the parking request, from the parking spaces having the unoccupied availability status.

The arrival sequence is a sequence of the waypoints that lead from a parking entrance of the parking area to the proposed parking space. Each of the waypoints, including the waypoints in the vehicle arrival sequence, further comprises a signal strength value for strength of the radio signals at the location of the waypoint and a time of flight value for relative timing of the radio signals at the location of the waypoint. The server transmits the vehicle arrival sequence to a vehicle. Radio triangulation or dead reckoning is used to navigate the vehicle between the waypoints of the vehicle arrival sequence.

The navigation system may further comprise a cellular device such as a smartphone. The parking request is input by a user on the cellular device. The cellular device transmits the request to the server and receives, from the server, the vehicle arrival sequence.

The server may also provide a walking arrival sequence of the waypoints leading from the proposed parking space to a walking destination. A walking destination node is located at a pedestrian entrance of the walking destination and has a destination low power radio transmitting a destination radio signal. The walking arrival sequence ends with a walking destination waypoint. The walking destination waypoint is at the pedestrian entrance and comprises a destination entrance identifier, a destination signal strength value for strength of the radio signals and the destination signal at the entrance, and a destination time of flight value for relative timing of the radio signals and the destination radio signal at the entrance.

Alternatively, the arrival sequence may be provided to a vehicle with an infotainment system but without a navigation feature or function. In such cases, the arrival sequence may be provided from the parking assist server to a program or application on the smartphone of the user. The application may employ the parking area nodes and parking assist server and communicate the arrival sequence to the infotainment system via an advanced peripheral interface module (APIM) of the infotainment system. The infotainment system then displays the arrival sequence to the user.

Alternatively, for the vehicle without a navigation feature, the application on the smartphone may communicate parking availability to the user. In such cases, the application may communicate to the user a parking lot row availability and provide a parking row and/or parking space identifier such as a parking row or space number. The parking lot row availability and identifier may be displayed to the user on the infotainment system via the APIM.

DETAILED DESCRIPTION OF PREFERRED EMBODIMENTS

Figure 1:
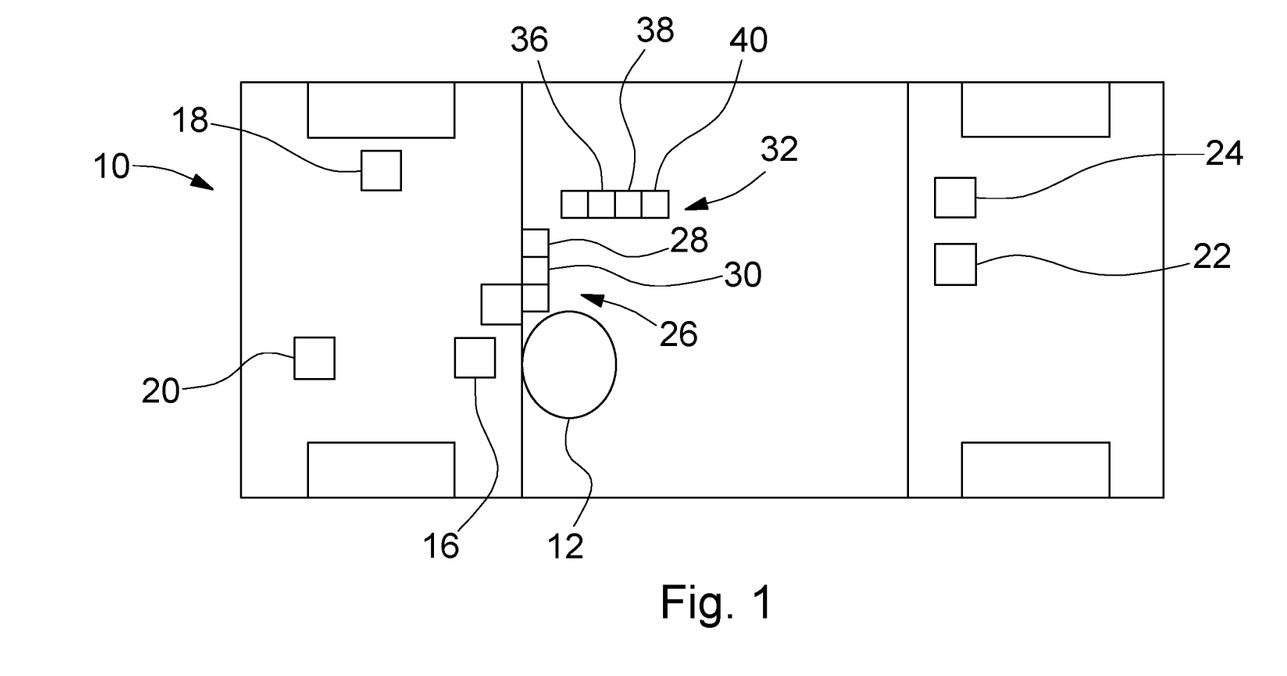
FIG. 1 is a schematic view of an automotive vehicle having vehicle navigation according to the present invention.

Referring now to FIG. 1, there is schematically illustrated an automotive vehicle, indicated generally at 10, having a steering wheel 12 and an ignition switch 14, a steering wheel rotation sensor 16, a wheel position sensor 18, an accelerometer 20, a magnetometer 22, and a location device 24. The location device 24 receives signals transmitted from satellites of a global navigation satellite system (GNSS). The vehicle 10 also includes a vehicle communications system and interface, indicated generally at 26, commonly known as an infotainment system. The communications system 26 includes an advanced peripheral interface module (APIM)

28 and a navigation module 30. The navigation module 30 utilizes the steering wheel rotation sensor 16, the wheel position sensor 18, the accelerometer 20, the magnetometer 22, and/or the location device 24 to provide location information for a driver of the vehicle 10.

Figure 2:
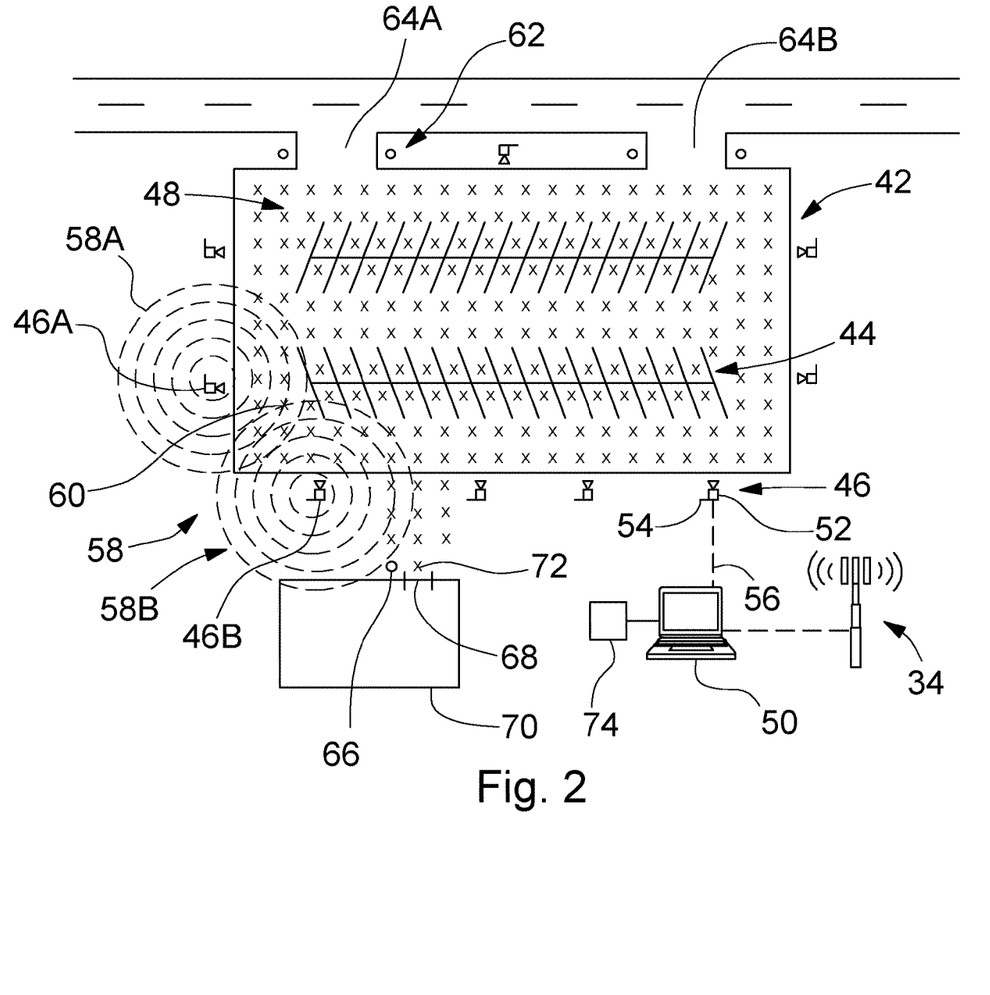
FIG. 2 is a schematic view of a parking area for use with the vehicle navigation according to the present invention.

Also illustrated in FIG. 1 is a cellular device, indicated generally at 32, that is in communication with a cellular communications network, indicated generally at 34 (illustrated in FIG. 2). The cellular device 32 includes a low power digital radio (LPR) receiver 36, a cellular radio 38, and a device GNSS receiver 40. The LPR receiver 36 may be a Bluetooth Low-Energy (BLE) radio, a ZigBee radio, an ANT wireless radio, an ultra-wide band communication radio, a WiFi radio, or similar. The cellular radio 38 communicates with the cellular network 34.

The cellular device 32 may connect to the APIM 28 via WiFi, Bluetooth, or a universal serial bus (USB) connection to receive signals or data from the vehicle 10. For example, the cellular device 32 may receive GNSS signals from the location device 24 of the vehicle 10. Typically, the location device 24 has a faster position fix rate and greater accuracy than the device GNSS receiver 40. The cellular device may also receive key on and key off signals. The cellular device 32 receives inputs using, for example, voice commands, a touch screen, steering wheel controls, or gestures.

The cellular device 32 may be a standalone unit such as a smartphone or cellular telephone of a driver of the vehicle and connected to the communications system 26 via the APIM 28. Alternatively, the cellular device 32 may be included as part of, or integrated into, the communications system 26. The APIM 28 allows the cellular device 32 to be controlled by the communications system 26 and vice versa as well as data produced, or received by, the cellular device 32 to be transferred between, or displayed on, the communications system 26 and vice versa.

Data may be transmitted to and from the communications system 26 via the cellular device 32 using the APIM 28. Alternatively, data may be transmitted to and from the communications system 26 via a WiFi network or other wireless computer network. For example, the WiFi network may be a personal network at a home or a public network at a store or other public location. The cellular device 32 may communicate with the WiFi network—and by extension the communications system 26—via the cellular network 34. Alternatively, data may be transmitted to and from the communications system 26 via a telematics control unit that includes a cellular modem. For example, the telematics control unit may include a cellular device integrated into the communications system 26 and distinct from the cellular device 32. The cellular device 32 may communicate with the telematics control unit—and by extension the communications system 26—via the cellular network 34.

Referring now to FIG. 2, there is illustrated a parking area, indicated generally at 42, having a plurality of parking spaces, indicated generally at 44. The parking area 42 also includes associated areas adjacent the parking spaces 44 such as pedestrian sidewalks or vehicle drives. Also illustrated are a plurality of parking area nodes, illustrated generally at 46, a plurality of waypoints, illustrated generally at 48, and a parking assist server 50. As illustrated, the parking area 42 is a parking lot. Alternatively, the parking area 42 may be other than a parking lot. For example, the parking area 42 may be a parking garage or deck, street parking, or any other defined set of parking spaces.

The nodes 46 are deployed in a node array over the parking area 42. As illustrated, the nodes 46 are deployed around, and outside, a perimeter of the parking area 42. Alternatively, the nodes 46 may be deployed other than around the perimeter of the parking area 42. For example, the nodes 46 may also be deployed within the parking area 42.

Each of the nodes 46 comprises a camera 52 and a low power radio (LPR) 54. Each of the cameras 52 captures images of the parking area 42. The cameras 52 are of a suitable type known to those skilled in the art. For example, the cameras 52 may be digital cameras. Each of the radios 54 transmits a unique radio signal, indicated generally at 58, receivable by the LPR receiver 36 in the cellular device 32. (For clarity, only two of the radio signals 58 are illustrated in FIG. 2.) The radios 54 may be battery powered. The nodes 46 may be mounted on lampposts in or around the parking area 42.

The images captured by the cameras 52 are transmitted via a data network 56 from the nodes 46 to the server 50. The network 56 connects all of the nodes 46 to the server 50, although, for clarity, the network 56 is illustrated connecting only a single of the nodes 46 to the server 50. The server 50 may be located at the parking area 42. Alternatively, the network 56 may be the Internet and the server 50 is a cloud-based computing resource. The network 56 may be wired or wireless. Alternatively, the network 56 may comprise the radios 54 transmitting the images to the server 50.

The waypoints 48 are deployed at locations in a waypoint array over the parking area 42. As illustrated, the waypoint array is not limited to the parking spaces 44. Each of the waypoints 48 comprises an identifier value for a location of a specific waypoint in the parking area, a signal strength value for strength of the radio signals 58 of the low power radios 54 at the location of the waypoint, and a time of flight value for relative timing of the radio signals 58 of the radios 54 at the location of the waypoint.

For example, a first node 46A transmits a first radio signal, indicated generally at 58A, and a second node 46B transmits a second radio signal, indicated generally at 58B. The identifier value for a typical waypoint 60 locates the typical waypoint 60 in the parking area 42 and is a physical location. For example, the identifier value may locate the first waypoint in a Cartesian coordinate system. As illustrated, the typical waypoint 60 receives the first and second radio signals 58A and 58B, respectively. The signal strength value for the typical waypoint 60 is the strength of the first and second radio signals 58A and 58B, respectively, at the location of the typical waypoint 60. The time of flight value for the typical waypoint 60 is the relative timing between the first and second radio signals 58A and 58B, respectively, at the location of the typical waypoint 60.

Because the typical waypoint 60 is typical of the waypoints 48, the discussion of the identifier value, signal strength value, and time of flight value for the typical waypoint 60 applies to each of the waypoints 48. As illustrated, the typical waypoint 60 receives two radio signals: the first and second radio signals 58A and 58B, respectively. However, other of the waypoints 48 may receive more or less than two radio signals.

The nodes 46 include a plurality of parking entrance/exit nodes, indicated generally at 62, located at first and second parking entrances/exits 64A and 64B, respectively. The first and second parking entrances/exits 64A and 64B, respectively, may each individually receive entry traffic, exit traffic, or both entry and exit traffic—i.e., either of the first or second parking entrance/exits 64A or 64B, respectively, may be a parking entrance, a parking exit, or both. Each of the parking entrance/exit nodes 62 comprises a parking entrance/exit low power radio transmitting a parking entrance/exit radio signal receivable by the LPR receiver 36. The parking entrance/exit nodes 62 may not include cameras.

The nodes 46 include a walking destination node 66 located at a pedestrian entrance 68 of a walking destination 70. The walking destination 70 is the destination of the driver of the vehicle 10. The destination node 66 comprises a destination low power radio transmitting a destination radio signal receivable by the LPR receiver 36. The destination node 66 may not include a camera. Also at the entrance 68 is a walking destination waypoint 72. The walking destination waypoint 72 comprises an identifier value, a signal strength value for strength of the radio signals of the radios 54 (including the destination low power radio) at the entrance 68, and a time of flight value for relative timing of the radio signals of the low power radios 54 (including the destination low power radio) at the entrance 68.

As discussed, the images captured by the camera 52 are transmitted to the server 50. Using known methods, the server 50 analyzes the images to detect an availability status of the parking spaces 44. For example, the server 50 may compare the transmitted images to reference images of the parking area 42 empty of vehicles. The availability status is occupied or unoccupied. The server 50 may store the availability status in a database 74.

Figure 3:
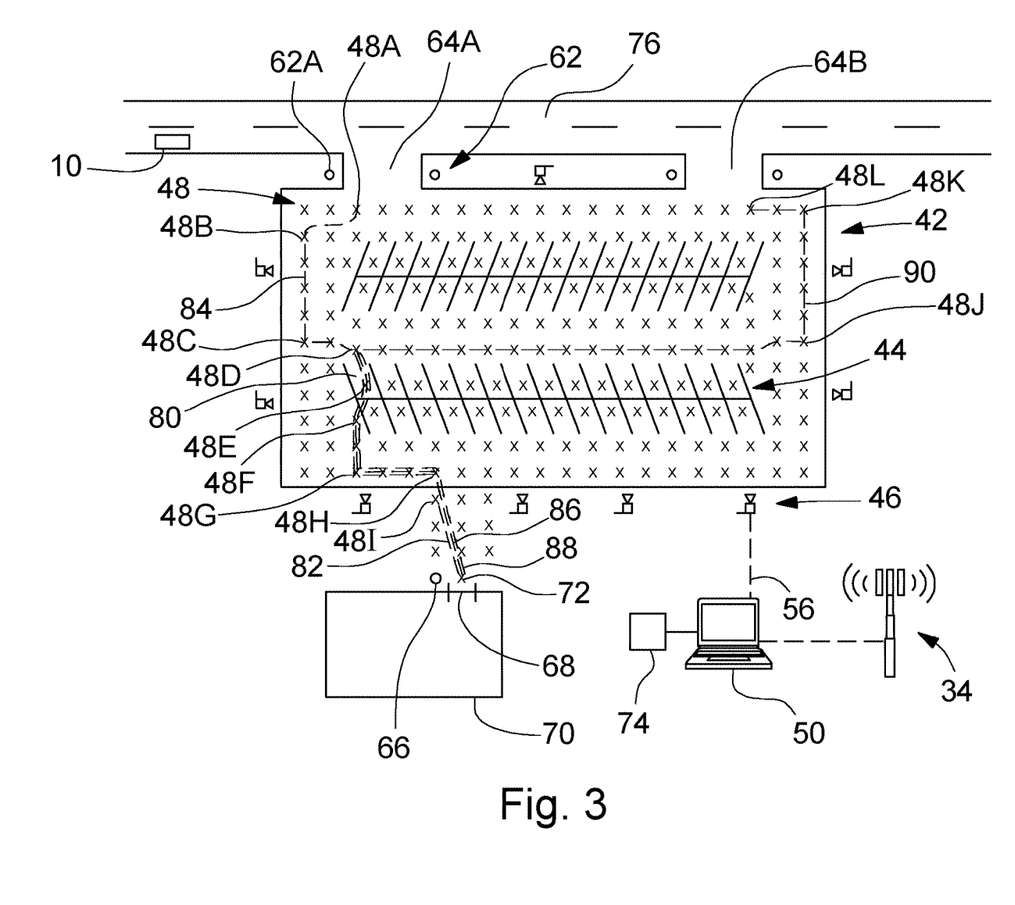
FIG. 3 is a schematic view of the parking area and showing operation of the vehicle navigation according to the present invention.
Figure 4A:
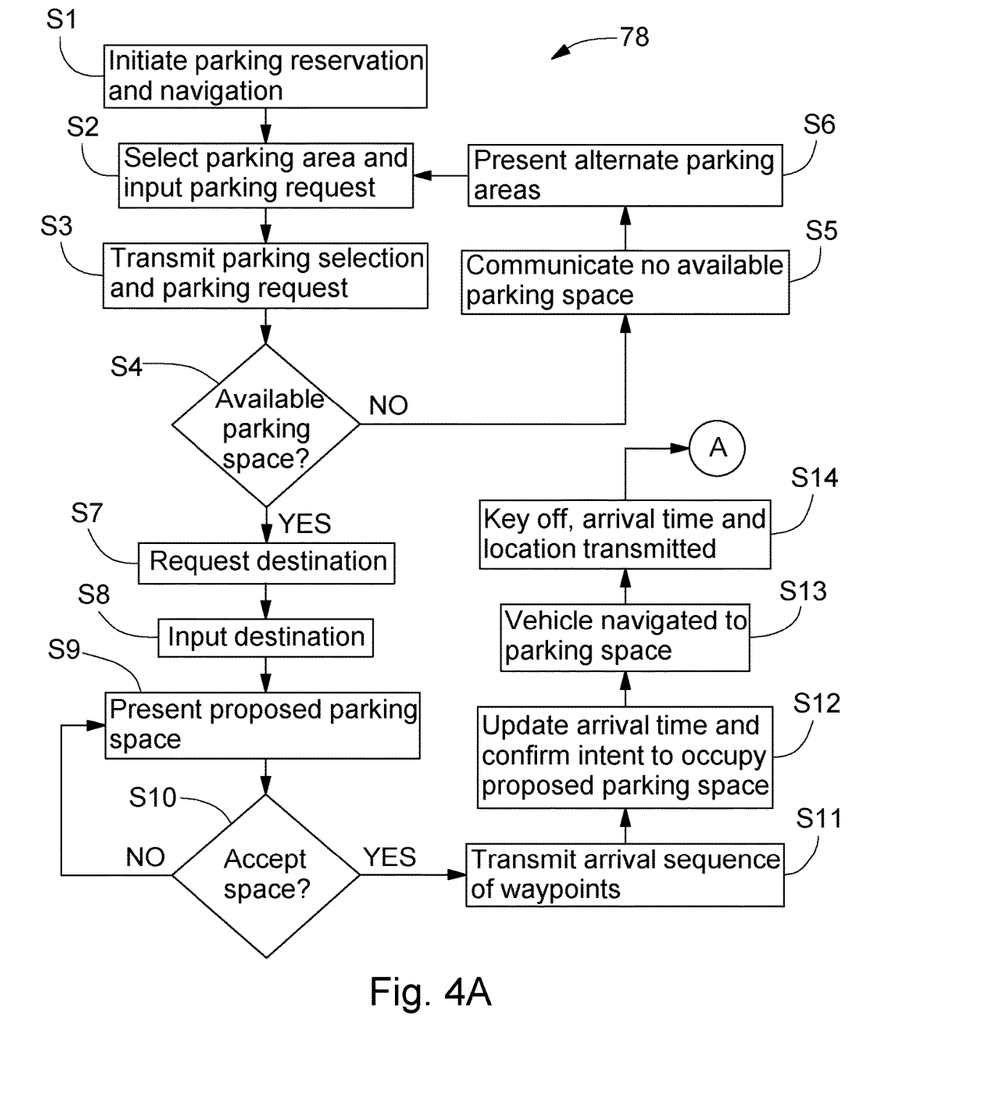
FIGS. 4A and 4B are a flow chart showing operation of the navigation system.
Figure 4B:
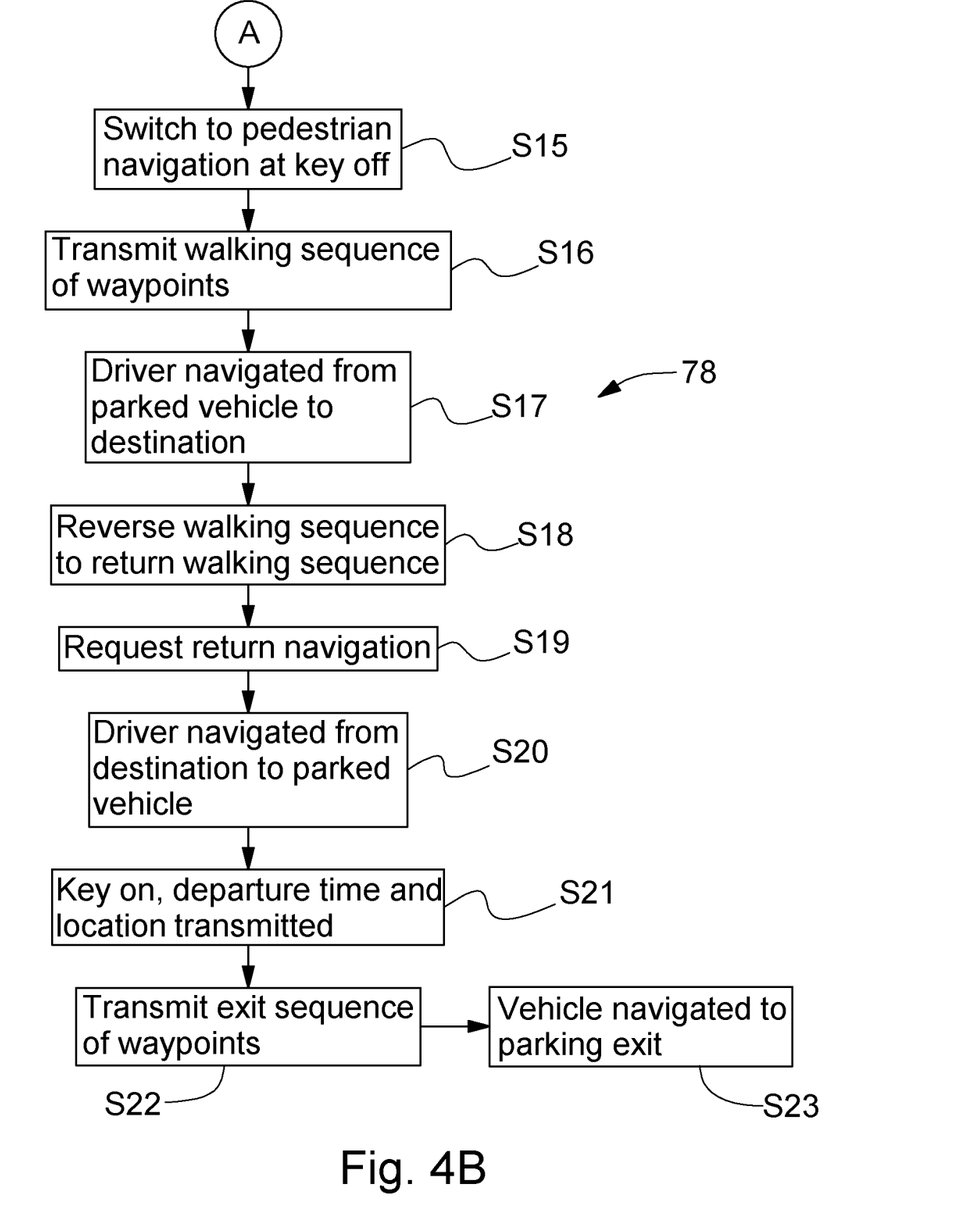

Referring now to FIGS. 3-4B, navigation of the vehicle 10 through the parking area 42 is illustrated. The vehicle 10 is travelling on a road 76. The driver or a user initiates, in a step S1, a parking reservation and navigation program, indicated generally at 78, on the cellular device 32. The user may be a passenger in the vehicle 10. The program 78 may be, for example, an application on the cellular device 32 or communications system 26. In a step S2, the driver or user selects the parking area 42 from a plurality of parking areas—e.g., separate parking lots or garages—near the destination 70 and then inputs a parking request. The parking selection and request are made through, or using, the communications system 26 and may be inputted, for example, using voice commands, a touch screen, steering wheel controls, or gestures. Alternatively, the parking selection and request may be input on the cellular device 32. In a step S3, the parking selection and request are transmitted from the cellular device 32, via the cellular network 34, and received by the server 50. The cellular device 32 and server 50 communicate with each other via the cellular network 34.

In a step S4, the server 50 determines if one of the parking spaces 44 has the unoccupied availability status. When all of the parking spaces 44 have the occupied availability status—i.e., the parking area 42 is full—then, in a step S5, the server 50 communicates to the cellular device 32 that there is no available parking space and, in a step S6, the driver is presented with other parking options to select. The program 78 then returns to the step S2. When at least one of the parking spaces 44 has the unoccupied status, then the program 78 proceeds to a step S7.

In the step S7, the server 50 requests the walking destination 70. The driver or user, in a step S8, inputs the walking destination 70 via the cellular device 32 for transmission to the server 50. Upon receipt of the destination 70, in a step S9, the server 50 selects a proposed parking space 80, from the parking spaces 44 having the unoccupied status. The server 50 may select the proposed parking space 80 from the parking spaces 44 using an algorithm that minimizes a walking distance 82 from the proposed parking space 80 to the entrance 68.

When minimizing the walking distance 82, the server 50 may, for example, consider distance and safety for the driver when walking to the destination 70 from the parking spaces 44 having the unoccupied status. Alternatively, the server 50 may consider factors other than the walking distance 82 when determining the proposed parking space 80. The driver may decide which factors the server 50 considers when selecting the proposed parking space 80.

In a step S9 the proposed parking space 80 is proposed to the driver or user. In a step S10, the driver decides whether to accept the proposed parking space 80. When the driver accepts the proposed parking space 80, the proposed parking space 80 is reserved and the program 78 proceeds to a step S11. Otherwise, the program 78 returns to the step S9 and a new proposed parking space is selected and proposed.

In the step S11, the server 50 provides and transmits to the cellular device 32 a vehicle arrival sequence 84 of the waypoints 48. The vehicle arrival sequence 84 leads the vehicle 10 through the parking area 42 to the proposed parking space 80 and includes the identifier, signal strength, and time of flight values for each of the waypoints 48 in the vehicle arrival sequence 84. When more than one route to the proposed parking space 80 is available, the server 50 may consider factors such as distance, traffic, or weather when defining the vehicle arrival sequence 84.

As illustrated, the vehicle arrival sequence 84 includes first, second, third, fourth, and fifth waypoints 48A-48E, respectively. As illustrated, the waypoints 48 intermediary between the first through fifth waypoints 48A-48E, respectively, are omitted from the vehicle arrival sequence 84. Alternatively, the waypoints 48 intermediary between the first through fifth waypoints 48A-48E, respectively, may be included in the vehicle arrival sequence 84.

The vehicle arrival sequence may begin with the identifier, signal strength, and time of flight values for a first parking entrance/exit node 62A. The driver will know the vehicle 10 is at the first parking entrance/exit 64A when the parking entrance/exit radio signal is very strongly detected by the cellular device 32.

In a step S12, an estimated arrival time of the vehicle 10 at the proposed parking space 80 is continually updated. The estimated arrival time may be displayed to the driver by, for example, the communications system 26. The driver's continued intention to occupy the proposed parking space 80 is also confirmed.

In a step S13, the vehicle 10 enters the parking area 42 and proceeds to navigate to the proposed parking space 80 by following the vehicle arrival sequence. Navigation between the first through fifth waypoints 48A-48E, respectively, may be accomplished using dead reckoning data transmitted by the server 50 with the vehicle arrival sequence. Dead reckoning navigation is known to those skilled in the art and, for the vehicle 10, utilizes a bearing, measured by the magnetometer 22, and a distance, measured by the wheel position sensor 18, from one waypoint to another. The bearing and distance are included in the dead reckoning data transmitted from the server 50. Alternatively, the bearing and distance may be determined by the cellular device 32. The dead reckoning navigation may be accomplished by the navigation module 30 or the cellular device 32. Navigation directions provided by the cellular device 32 may be displayed to the driver on the communications system 26 via the APIM 28.

Alternatively, navigation through the vehicle arrival sequence 84 is accomplished by the cellular device 32 using known methods of radio triangulation—i.e., radio direction finding—to provide navigation directions to the driver. The directions may be displayed to the driver on the communications system 26 via the APIM 28. The cellular device 32 uses radio triangulation with the radio signals 58 received by the LPR receiver 36 and the signal strength and time of flight values for the first through fifth waypoints 48A-48E in the vehicle arrival sequence.

For either dead reckoning or radio triangulation navigation, the cellular device 32 may provide the navigation directions or data that are transferred to the communications system 26 via the APIM 28 and without use of the navigation module 30. As such, the navigation module 30 may be omitted from the vehicle 10. Alternatively, the program 78 may only communicate to the driver or user that the proposed parking space 80 is available, with or without a general location such as a parking row number or other identifier, and without the vehicle arrival sequence 84.

In a step S14, the driver has turned off the ignition switch 14—i.e., key off. An arrival time of the vehicle 10 in the proposed parking space 80, a GNSS location, and/or radio signal strength and time of flight values for where the vehicle 10 is parked are transmitted by the cellular device 32 to the server 50 to be recorded in the database 74. Also at key off, in a step S15, the cellular device 32 transmits a walking departure time to the server 50 for recording in the database 74.

In a step S16, the server 50 provides and transmits a walking arrival sequence 86 of the waypoints 48 to the cellular device 32. The walking arrival sequence 86 leads the driver from the proposed parking space 80 to the destination 70. As illustrated, and is typical, the walking arrival sequence 86 follows the same route as the walking distance 80. Alternatively, the walking arrival sequence 86 may be different than the walking distance 82. For example, the walking arrival sequence 86 may be different than the walking distance 82 when conditions such as traffic or weather change after the vehicle arrival sequence 84 is provided by the server 50 to the cellular device 32.

As illustrated, the walking arrival sequence 86 includes fifth, sixth, seventh, eighth, and ninth waypoints 48E-48I, respectively, and ends with the walking destination waypoint 72. Similar to the vehicle arrival sequence 84, the waypoints 48 intermediary between the fifth waypoint 48E and the walking destination waypoint 72 may be omitted or included.

The driver exits the vehicle 10 to navigate to the walking destination 70 on foot by following the walking arrival sequence 86. Navigation between the fifth through ninth waypoints 48E-48I, respectively, and the walking destination waypoint 72 may be accomplished using dead reckoning data transmitted by the server 50 with the walking arrival sequence 86. Alternatively, the driver may navigate between the first through fifth waypoints 48E-48I, respectively, and the walking destination waypoint 72 using known methods of radio triangulation with the signal strength and time of flight values for the fifth through ninth waypoints 48E-48I, respectively, and the walking destination waypoint 72 in the vehicle arrival sequence. Navigation through the walking arrival sequence 86 is provided by the cellular device 32.

On reaching the destination 70, in a step S18, the cellular device 32 reverses an order of the waypoints 48 in the walking arrival sequence 86 to a walking departure sequence 88 of the waypoints 48 for a return trip from the destination 70 to the proposed parking space 80. For example, when the walking arrival sequence 86 is, in order, the fifth through ninth waypoints 48E-48I, respectively, and ends with the walking destination waypoint 72, then the cellular device 32 reverses the walking arrival sequence 86 to be the walking departure sequence 88 of, in order, the walking destination waypoint 72 and the ninth through the fifth waypoints 48I-48E. The cellular device also reverses the dead reckoning information for the walking arrival sequence 86 to lead from the walking destination waypoint 72 to the fifth waypoint 48E. Alternatively, the server 50 may provide the walking departure sequence 88. For example, the server 50 may provide the walking departure sequence 88 by reversing the order of the waypoints 48 in the walking arrival sequence 86.

As illustrated, the walking departure sequence 88 follows the route of the walking arrival sequence 86. Alternatively, the walking departure sequence 88 may be other than as illustrated.

In a step S19, upon completing his or her activities at the destination 70, the driver uses the cellular device 32 to request navigation back to the proposed parking space 80. In a step S20, the driver navigates through the walking departure sequence 88 using dead reckoning or radio triangulation provided by the cellular device 32.

In a step S21, a parked vehicle departure time, as well as the GNSS location and/or radio signal strength and time of flight values for where the vehicle 10 is parked are transmitted by the cellular device 32 to the server 50 when the driver turns the ignition switch 14 back on—i.e., key on—and the vehicle 10 departs from the proposed parking space 80. The parked vehicle arrival and departure times may be used by the server 50 to calculate an occupancy duration of the vehicle 10 in the proposed parking space 80 for billing or other analysis.

In a step S22, the server 50 provides and transmits a vehicle departure sequence 90 of the waypoints 48 that leads from the proposed parking space 80 to the road 76. The vehicle departure sequence 90 may be the vehicle arrival sequence 84 in reverse. Alternatively, the vehicle departure sequence 90 may be other than the vehicle arrival sequence 84 in reverse because of conditions such as traffic, weather, or a next destination of the driver. As illustrated, the vehicle arrival sequence includes the fifth waypoint 48E and tenth, eleventh, and twelfth waypoints 48J-48L, respectively. Similar to the vehicle arrival sequence 84, the waypoints 48 intermediary between the fifth waypoint 48E and the tenth, eleventh, and twelfth waypoints 48J-48L, respectively, may be omitted or included.

In a step S23, the vehicle 10 navigates out of the parking area 42 by following the vehicle departure sequence 90 using dead reckoning data transmitted by the server 50 or using radio triangulation. Similar to the vehicle arrival sequence 84, dead reckoning navigation is provided by the navigation module 30 or the cellular device 32 and radio triangulation navigation is provided by the cellular device 32.

In accordance with the foregoing, a method of vehicle navigation has been described having significant advantages over the prior art. A vehicle navigation system is provided for when a GNSS signal is unavailable or otherwise degraded.

What is claimed is:

1. A navigation system for a parking area comprising a plurality of parking spaces and a plurality of waypoints, deployed in a waypoint array over the parking area, each waypoint comprising an identifier value for a location in the parking area, the system comprising:
    a plurality of parking area nodes, deployed in a node array over the parking area, each node comprising:
        a camera; and
        a low power radio transmitting a unique radio signal;

a cellular device, wherein a parking request and a walking destination from a user are each input on the cellular device; and a parking assist server in communication with the nodes and the cellular device, wherein the server:

analyzes images of the parking area captured by the cameras to detect an availability status of the parking spaces, the availability status being occupied or unoccupied;

receives the parking request from the cellular device;

in response to the request, sends to the user a proposed parking space from the parking spaces having the unoccupied availability status;

provides a vehicle arrival sequence of the waypoints leading from a parking entrance of the parking area to the proposed parking space, wherein each of the waypoints further comprises a fixed signal strength value for strength of the radio signals at the location of the waypoint and a fixed time of flight value for relative timing of the radio signals at the location of the waypoint, wherein the plurality of waypoints is a plurality of radio waypoints; and provides a walking arrival sequence of the waypoints leading from the proposed parking space to the walking destination.

2. The system of claim 1 wherein the parking request and the walking destination are each transmitted to the server by the cellular device.

3. The system of claim 2 further comprising:
a vehicle, wherein the cellular device is integrated into the vehicle.

4. The system of claim 1 wherein the vehicle arrival sequence is received by the cellular device.

5. The system of claim 1 wherein the server transmits the vehicle arrival sequence to a vehicle and radio triangulation is used to navigate the vehicle between the waypoints of the vehicle arrival sequence.

6. The system of claim 1 wherein the server transmits the vehicle arrival sequence to a vehicle and dead reckoning is used to navigate the vehicle between the waypoints of the vehicle arrival sequence.

7. The system of claim 1 wherein a driver selects the parking area.

8. The system of claim 1 wherein the server proposes the proposed parking space to minimize a walking distance from the proposed parking space to the walking destination.

9. The system of claim 1 further comprising:
a walking destination node comprising a destination low power radio transmitting a destination radio signal, wherein the walking destination node is located at a pedestrian entrance of the walking destination; and
a walking destination waypoint at the entrance comprising:
 a destination entrance identifier value;
 a destination signal strength value for strength of the radio signals and the destination radio signal at the entrance; and
 a destination time of flight value for relative timing of the radio signals and the destination radio signal at the entrance, wherein the walking arrival sequence ends with the walking destination waypoint.

10. The system of claim 1 wherein the server provides a walking departure sequence of the waypoints leading from the walking destination to the proposed parking space.

11. The system of claim 10 wherein the server provides the walking departure sequence by reversing an order of the waypoints in the walking arrival sequence.

12. The system of claim 1 further comprising:
wherein the cellular device displays a walking departure sequence of the waypoints leading from the walking destination to the proposed parking space by reversing an order of the waypoints in the walking arrival sequence.

13. The system of claim 1 wherein the server provides a vehicle departure sequence of the waypoints leading from the proposed parking space to a parking exit of the parking area.

14. The system of claim 1 wherein, for each of the nodes, the radio transmits to the server the images captured by the camera.

15. The system of claim 1 wherein the server stores the availability status in a database.

16. The navigation system of claim 1 wherein the waypoints are at different locations from the parking area nodes.

17. A navigation system for a parking area comprising:
a plurality of nodes, each node comprising:
 a camera capturing images of the area; and
 a low power radio transmitting a radio signal;
a cellular device, wherein a parking request and a walking destination from a user are each input on the cellular device; and
a server communicating with the nodes and the cellular device, wherein the server:
 analyzes the images to propose a parking space;
 receives the parking request from the cellular device;
 provides an arrival sequence of radio waypoints to the parking space, each of the waypoints comprising fixed strength and time of flight values of the radio signals; and
 provides a walking arrival sequence of the waypoints leading from the proposed parking space to the walking destination.

18. The system of claim 17 wherein the server transmits the arrival sequence to a vehicle and radio triangulation is used to navigate the vehicle between the waypoints of the arrival sequence.

19. The system of claim 17 wherein the server transmits the arrival sequence to a vehicle and dead reckoning is used to navigate the vehicle between the waypoints of the arrival sequence.

20. A method of navigating a parking area comprising a plurality of parking area nodes, deployed in a node array over the parking area, each node comprising a camera and a low power radio transmitting a radio signal and a plurality of waypoints, deployed in a waypoint array over the parking area, each waypoint comprising fixed values of strength and relative timing of the radio signals, the method comprising:
capturing images of the parking area using the plurality of cameras;
transmitting the images to a parking assist server;
analyzing the images to detect an availability status of a plurality of parking spaces in the parking area, the availability status being occupied or unoccupied;
receiving a parking request from a cellular device, wherein the parking request and a walking destination from a user are each input on the cellular device;
proposing, in response to the request, a proposed parking space from the parking spaces having the unoccupied availability status;
transmitting, from the server, a vehicle arrival sequence of the waypoints leading to the proposed parking space, wherein the waypoints of the vehicle arrival sequence include the fixed values of strength and relative timing of the radio signals, wherein the plurality of waypoints is a plurality of radio waypoints; and transmitting, from the server, a walking arrival sequence of the waypoints leading from the proposed parking space to the walking destination.

21. The method of claim 20 further comprising:

transmitting, from the cellular device to the server, the request; and receiving, on the cellular device from the server, the vehicle arrival sequence.

22. The method of claim 20 further comprising:

navigating a vehicle between the waypoints of the arrival sequence using radio triangulation, wherein the server transmits the arrival sequence to the vehicle.

23. The method of claim 20 further comprising:

navigating a vehicle between the waypoints of the arrival sequence using dead reckoning, wherein the server transmits the arrival sequence to the vehicle.

24. A navigation system for a parking area comprising a plurality of parking spaces and a plurality of waypoints, deployed in a waypoint array over the parking area, each waypoint comprising an identifier value for a location in the parking area, the system comprising:

a plurality of parking area nodes, deployed in a node array over the parking area, each node comprising:

a camera; and a low power radio transmitting a unique radio signal;

a parking assist server in communication with the nodes, wherein the server:

analyzes images of the parking area captured by the cameras to detect an availability status of the parking spaces, the availability status being occupied or unoccupied;

receives a parking request from a user;

in response to the request, sends to the user a proposed parking space from the parking spaces having the unoccupied availability status; and provides a vehicle arrival sequence of the waypoints leading from a parking entrance of the parking area to the proposed parking space, wherein each of the waypoints further comprises a signal strength value for strength of the radio signals at the location of the waypoint and a time of flight value for relative timing of the radio signals at the location of the waypoint; and a cellular device, wherein the cellular device transmits to the server a vehicle arrival time at key off of a vehicle that has followed the vehicle arrival sequence to the proposed parking space, the cellular device transmits to the server a vehicle departure time at subsequent key on and departure of the vehicle from the proposed parking space, and the server calculates an occupancy duration of the vehicle in the proposed parking space.

* * * * *